(12) United States Patent
Masuda et al.

(10) Patent No.: US 7,652,110 B2
(45) Date of Patent: Jan. 26, 2010

(54) POWDER COATING COMPOSITION

(75) Inventors: Sho Masuda, Chiyoda-ku (JP); Yuji Hara, Chiyoda-ku (JP); Kouichi Sasaki, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/248,923

(22) Filed: Oct. 10, 2008

(65) Prior Publication Data

US 2009/0043062 A1    Feb. 12, 2009

Related U.S. Application Data

(63) Continuation of application No. PCT/JP2007/059681, filed on May 10, 2007.

(30) Foreign Application Priority Data

May 11, 2006 (JP) .............................. 2006-132503

(51) Int. Cl.
*C08F 12/20* (2006.01)
(52) U.S. Cl. .................. 526/249; 526/250; 526/312; 526/319; 526/332
(58) Field of Classification Search ............... 526/249
See application file for complete search history.

(56) References Cited

U.S. PATENT DOCUMENTS

| | | | |
|---|---|---|---|
| 7,153,907 | B2 | 12/2006 | Asakawa et al. |
| 7,414,084 | B2 | 8/2008 | Yamaguchi et al. |
| 2004/0176543 | A1 * | 9/2004 | Asakawa et al. ......... 525/326.3 |

FOREIGN PATENT DOCUMENTS

| | | |
|---|---|---|
| JP | 61-181567 | 8/1986 |
| JP | 61-181571 | 8/1986 |
| JP | 61-181572 | 8/1986 |
| JP | 6-104792 | 12/1994 |
| JP | 07-003202 | 1/1995 |
| JP | 9-165535 | 6/1997 |
| JP | 2003-082295 | 3/2003 |
| JP | 2004-35876 | 2/2004 |
| JP | 2006-002034 | 1/2006 |

OTHER PUBLICATIONS

"Powder and Industry" Complied by The Association of Powder Process Industry and Engineering, Japan, 1984, February issue, p. 33 to 42.

* cited by examiner

*Primary Examiner*—Mark Eashoo
*Assistant Examiner*—Nicole M Buie
(74) *Attorney, Agent, or Firm*—Oblon, Spivak, McClelland, Maier & Neustadt, L.L.P.

(57) ABSTRACT

The claimed invention relates to a powder coating composition containing a fluorinated copolymer (X) having a glass transition point of at least 50° C. and a number average molecular weight of from 10,000 to 22,000, and a curing agent (Y), wherein the fluorinated copolymer (X) is a copolymer obtained by polymerization of a monomer mixture containing (A) from 45 to 55 mol % of chlorotrifluoroethylene and/or tetrafluoroethylene, (B) from 2 to 40 mol % of a vinyl ether which has a $C_{4\ or\ 5}$ alkyl group containing a tertiary carbon atom, (C) from 5 to 20 mol % of a vinyl ether having a crosslinkable functional group, and (E) from 1 to 32 mol % of a vinyl ester which has a $C_{3-5}$ alkyl group containing a tertiary or higher carbon atom, wherein the total content of (B) and (E) is from 30 to 50 mol %, and the curing agent (Y) is reactive with the crosslinkable functional group.

6 Claims, No Drawings

POWDER COATING COMPOSITION

TECHNICAL FIELD

The present invention relates to a powder coating composition.

BACKGROUND ART

Recently, powder coating has been widely used for general metal coating from the viewpoint of advantages such as pollution-free, resource saving, and power saving, and particularly, it is widely used for road/construction materials such as bridges, bridge railings, gates, fences, house siding materials which are required to have weather resistance; bodies and parts of automobiles; and home electric appliances.

As the powder coating, a method of coating a thermoplastic fluororesin powder made of an ethylene/tetrafluoroethylene copolymer is known (the following Patent Documents 1 to 3).

Further, as a thermosetting powder coating material to be used for the powder coating, a polyester resin powder coating material containing a block isocyanate compound, triglycidyl isocyanurate, etc., as a curing agent, or an acrylic resin powder coating material having a glycidyl group and using a dibasic acid as a curing agent, is known (the following Non-Patent Document 1).

The coating material made of the above thermoplastic fluororesin powder has suitable weather resistance, but it has drawbacks in coating workability such that the dispersibility of a pigment, glossiness of the coated film surface and adhesion with a base material are poor, and in the coating operation, it is required to be heated to a temperature higher than the melting point of the fluororesin, whereby a large amount of heat energy is consumed.

On the other hand, with respect to the latter polyester resin powder coating material or acrylic resin powder coating material, instead of having the same drawbacks as the above powder coating material made of the thermoplastic fluororesin powder, it has a drawback of not having sufficient weather resistance.

To overcome such a problem, the following Patent Document 4 suggests a thermosetting powder coating composition which comprises (A) a fluorinated copolymer containing fluoroolefin units and having a fluorine content of at least 10 wt %, an intrinsic viscosity in a range of from 0.05 to 2 dl/g, as measured in tetrahydrofuran at 30° C., a glass transition temperature of from 30 to 120° C., and crosslinkable groups, and (B) a curing agent (which is one except for a polyfunctional organic silicon compound containing an isocyanate group directly bonded to a silicon atom) which may react with the crosslinkable groups contained in (A) the fluorinated copolymer to form crosslinks, in a weight ratio of (A)/(B) being from 40/60 to 98/2, wherein the loss on heat of (A) the fluorinated copolymer is at most 5 wt % under a condition of 105° C. for 3 hours; and particularly such a thermosetting fluororesin powder coating composition having a glass transition temperature of from 30 to 120° C.

However, recently, as the application range of the thermosetting fluororesin powder coating composition has expanded to outer plates of buildings or aluminum sashes, a coated film is required to have a higher level of flexibility and appearance.

The flexibility of the coated film, for example, can be improved by increasing the molecular weight of the fluorinated copolymer which will be a binder component in the coating composition. However, such means an increase of the melt viscosity of the resin, and with a powder coating material to be subjected to a film-forming process covering from melting by heating to a curing reaction, the appearance of a coated film will be poor if the melt viscosity increases. On the other hand, if the molecular weight of the fluorinated copolymer is decreased, the melt viscosity becomes low, and although the appearance as the coated film will be improved, the flexibility will decrease.

Further, even if the molecular weight of the fluorinated copolymer is relatively large, it is possible to lower the melt starting temperature by lowering the glass transition point, whereby it is possible to satisfy both physical property and appearance by sufficiently spreading the composition before the reaction initiation temperature of the curing agent. However, if such a method is actually used, there will be a problem of blocking such that the glass transition point will be at most 50° C., and the solid powder coating material will be hardened during its storage and will not be applied.

Thus, it is extremely difficult to satisfy both the appearance and flexibility of the coated film while preventing the blocking in the powder coating material.

To overcome such a problem, the following Patent Document 5 suggests a composition made by mixing a fluorinated copolymer having vinylidene fluoride as the main component and an acrylic polymer having methyl methacrylate as the main component. However, the copolymer having vinylidene fluoride as the main component has crystallinity, whereby the transparency tends to decrease, and it is difficult to form a coated film excellent in appearance.

Further, the following Patent Document 6 introduces a technique of blending a thermoplastic fluororesin in a thermosetting fluororesin powder coating composition. According to such a method, it is possible to expect improvement of the physical property of the thermoplastic fluororesin having a relatively high molecular weight and improvement of the appearance without causing a curing reaction as the thermoplastic resin, but the compatibility between the thermosetting fluororesin powder coating composition and the thermoplastic fluororesin will be poor and the gloss tends to deteriorate, whereby it is difficult to obtain a coated film excellent in the appearance. Further, when the thermoplastic fluororesin is to be blended in the thermosetting fluororesin powder coating composition, there will be a practical difficulty in production. That is, with respect to a melt-kneading method which is currently main as a process for producing a thermosetting powder coating composition, it is necessary to pulverize thermosetting powder coating pellets after the kneading step, and in order to efficiently pulverize the thermoplastic resin, freeze pulverization such as cooling down to a stiffening point or lower, is required, whereby the pulverization will require a great amount of energy.

Patent Document 1: JP-A-61-181567
Patent Document 2: JP-A-61-181571
Patent Document 3: JP-A-61-181572
Patent Document 4: Japanese Patent No. 1973174
Patent Document 5: JP-A-9-165535
Patent Document 6: JP-A-2004-35876
Non-Patent Document 1: "Powder and Industry" Compiled by The Association of Powder Process Industry and Engineering, Japan, 1984, February issue, p. 33 to 42

DISCLOSURE OF THE INVENTION

Object to be Accomplished by the Invention

The present invention has been made under the above circumstances, and it has an object to provide a powder coating composition which can fulfill both good coated film appearance and flexibility.

Means to Accomplish the Object

In order to accomplish the above object, the powder coating composition of the present invention comprises a fluorinated copolymer (X) having a glass transition point of at least 50° C. and a number average molecular weight of from 10,000 to 22,000, and a curing agent (Y), wherein the fluorinated copolymer (X) is a copolymer obtained by polymerization of a monomer mixture comprising (A) from 45 to 55 mol % of chlorotrifluoroethylene and/or tetrafluoroethylene, (B) from 2 to 40 mol % of a vinyl ether which has a $C_{4\ or\ 5}$ alkyl group containing a tertiary carbon atom, (C) from 5 to 20 mol % of a vinyl ether having a crosslinkable functional group and (E) from 0 to 32 mol % of a vinyl ester which has a $C_{3-5}$ alkyl group containing a tertiary or higher carbon atom, wherein the total content of the above (B) and (E) is from 30 to 50 mol %, and the curing agent (Y) is reactive with the crosslinkable functional group.

EFFECTS OF THE INVENTION

According to the present invention, it is possible to obtain a powder coating composition which can be used as a powder coating material at room temperature without a problem, and which can satisfy both good coated film appearance and flexibility.

BEST MODE FOR CARRYING OUT THE INVENTION

Fluorinated Copolymer (X)

The fluorinated copolymer (X) is a copolymer obtained by polymerizing the following monomers.

Monomer (A)

As a monomer (A), it is possible to use chlorotrifluoroethylene or tetrafluoroethylene, or it is possible to use both of them in combination as a mixture.

Chlorotrifluoroethylene or tetrafluoroethylene is an important monomer for constituting a fluorinated copolymer, and by subjecting it to alternating copolymerization with a monomer made of a vinyl ether, it is possible to form a fluorinated copolymer which provides excellent weather resistance. Chlorotrifluoroethylene is more readily copolymerizable by such alternating copolymerization.

Chlorotrifluoroethylene is preferred also from a viewpoint such that by the polarity provided from a chlorine atom of the main chain, the adhesion and pigment dispersibility in the coated film of the fluorinated copolymer are excellent as compared with tetrafluoroethylene.

Further, when chlorotrifluoroethylene is used, the surface tension of the fluorinated copolymer becomes large as compared with a case where tetrafluoroethylene is used, and such a surface tension will be close to a surface tension of a branched polyester resin used in many thermosetting powder coating materials, whereby even if the fluororesin is mixed in a polyester resin type powder coating material by mistake, a coated film defect such as cissing will rarely be formed. Therefore, chlorotrifluoroethylene is more preferred also from a viewpoint such that it is possible to produce the powder coating composition of the present invention by using the existing production facility for the polyester type powder coating material.

The amount of the monomer (A) to be used is preferably from 45 to 55 mol %, more preferably from 48 to 52 mol %, based on the sum of all monomers to be used for synthesis of the fluorinated copolymer (X) (namely, the entire monomer mixture to be used for the synthesis of the fluorinated copolymer (X), the same applies hereinafter). When the amount is at least 45 mol %, the weather resistance performance by the fluorinated copolymer (X) will be good. When the amount is at most 55 mol %, the amount of a homopolymer of the monomer (A) in the fluorinated copolymer (X) will be small, and the crystallinity will be suppressed, whereby transparency of a coated film will be improved, and additionally, the alternating copolymerization property of the monomer (A) and a vinyl ether will be good, and the weather resistance performance of the coated film will be good.

Monomer (B)

A monomer (B) is a vinyl ether having a $C_{4\ or\ 5}$ alkyl group containing a tertiary carbon atom. In the present invention, "a vinyl ether" is a compound having a hydrogen atom of a hydroxyl group of a vinyl alcohol substituted by a substituent R, and it is a compound represented by the general formula: $CH_2=CH(OR)$ (1).

In the monomer (B), the substituent R in the above general formula (1) is "a $C_{4\ or\ 5}$ alkyl group containing a tertiary carbon atom."

Specific examples of the monomer (B) may be tert-butyl vinyl ether, isobutyl vinyl ether, neopentyl vinyl ether and 2-ethyl propyl vinyl ether. Among them, tert-butyl vinyl ether is preferred from the viewpoint that the glass transition point of the fluorinated copolymer (X) will easily be high.

With respect to the monomer (B), an alkyl group as the substituent R contains a tertiary carbon atom, whereby the flexibility of the main chain of the copolymer is suppressed by steric hindrance, and the glass transition point becomes high. Moreover, when a crosslinking reaction is carried out by using a curing agent, a cyclization reaction wherein functional groups in a molecule are crosslinked each other, will be suppressed. Further, a substitution reaction will less likely take place as compared with an alkyl chain having a cyclic structure, whereby an inaccurate reaction will less likely take place. Therefore, the crosslinking reaction will be carried out uniformly, and the curing and shrinking stress after the crosslinking reaction will be uniform, whereby it is possible to form a coated film excellent in the appearance and flexibility.

Further, when the number of carbon atoms of the alkyl group as the substituent R is at most 5, it tends to be easy to obtain a glass transition point of at least 50° C., which is preferred for an application as a powder coating material.

Such monomers (B) may be used alone or in combination as a mixture of two or more of them.

The amount of the monomer (B) to be used is preferably from 2 to 40 mol %, more preferably from 3 to 30 mol %, based on the total monomers to be used for synthesis of the fluorinated copolymer (X). When the amount of the monomer (B) is at least 2 mol %, it is possible to obtain the glass transition point of at least 50° C., which is preferred for an application as a powder coating material, and the degree of freedom of the main chain of the fluorinated copolymer (X) is suitably suppressed, whereby the appearance and physical property of the coated film will be good. On the other hand, when the amount of the monomer (B) is adjusted to be at most 40 mol %, it is possible to properly introduce a monomer (C) which contributes to a crosslinking reaction, in the fluorinated copolymer (X), whereby it is possible to obtain a coated film having a good physical property.

Monomer (C)

A monomer (C) is a vinyl ether having a crosslinkable functional group.

In the monomer (C), the substituent R in the above general formula (1) is "a substituent having a crosslinkable functional group."

The specific examples of the crosslinkable functional group may be a hydroxyl group, a carboxyl group, a glycidyl group, an isocyanate group and a vinyl group. Among them, a hydroxyl group is preferred from a viewpoint such that the stability of the copolymer is excellent, and it is possible to use a readily available curing agent.

"The substituent having a crosslinkable functional group" as the substituent R in the above general formula (1) is preferably a linear, branched or cyclic alkyl group wherein one hydrogen atom is substituted with the above "crosslinkable functional group". The number of carbon atoms of the alkyl group (not including carbon atoms of a crosslinkable functional group) is preferably 2 to 8, more preferably from 2 to 5.

The specific examples of the monomer (C) may be a hydroxyalkyl vinyl ether such as hydroxyethyl vinyl ether, hydroxybutyl vinyl ether or hydroxyneopentyl vinyl ether; and a hydroxycycloalkyl vinyl ether such as cyclohexylmethyl vinyl ether monomethyl alcohol (e.g. [4-(vinyloxymethyl)cyclohexyl])methan-1-ol). Among them, hydroxybutyl vinyl ether is preferred from a viewpoint such that reactivity is excellent, and that the glass transition point rarely decreases.

The monomers (C) may be used alone or in combination as a mixture of two or more of them.

The amount of the monomer (C) to be used is preferably from 5 to 20 mol %, more preferably from 5 to 15 mol %, based on the total monomers to be used for synthesis of the fluorinated copolymer (X). When the amount is at most 5 mol %, the sufficient crosslinked sites will be formed in the coated film, whereby the physical property of the coated film will be good. On the other hand, when the amount of the monomer (C) is at most 20 mol %, crosslinked sites will be proper and the coated film will not be too hard, whereby the toughness will rarely decrease.

Monomer (D)

A monomer (D) is a vinyl ether other than the vinyl ether included in the above monomer (B) or monomer (C). Namely, the monomer (D) does not contain a monomer included in the above monomer (B) and a monomer included in the above monomer (C).

In the monomer (D), the alkyl group as the substituent R of the above general formula (1) may be a linear form, a branched form or a cyclic form, and the linear alkyl group is preferred from a viewpoint such that the reactivity with the monomer (A) in the presence of the monomer (B) is excellent. The number of carbon atoms in the linear alkyl group is preferably from 2 to 6, more preferably from 2 to 4.

The specific examples of the monomer (D) may be ethyl vinyl ether or n-butyl vinyl ether. Between them, ethyl vinyl ether is more preferred from a viewpoint such that the glass transition point will rarely decrease.

With respect to the fluorinated copolymer (X), such monomers (D) may be used alone or in combination as a mixture of two or more of them.

In the present invention, the monomer (D) is not essential, but by using it, the flexibility will further be improved.

When the monomer (D) is used, its amount to be used is preferably from 1 to 15 mol %, more preferably from 5 to 15 mol %, further preferably from 5 to 10 mol %, based on the total monomers to be used for synthesis of the fluorinated copolymer (X). By adjusting the amount of the monomer (D) to be used to be from 1 to 15 mol %, it is possible to sufficiently obtain the desired effects of the monomers (A) to (E).

Monomer (E)

A monomer (E) is a vinyl ester having "a $C_{3-5}$ alkyl group containing a tertiary or higher carbon atom".

The monomer (E) is represented by the general formula: R'COOCH=$CH_2$ (2) (wherein R' is a $C_{3-5}$ alkyl group containing a tertiary or higher carbon atom). That is, R' is a $C_{3-5}$ alkyl group wherein at least one carbon atom constituting the alkyl group is bonded with 3 or 4 carbon atoms (including a carbon atom constituting an ester bond —COO—) The number of carbon atoms of R' is preferably from 3 to 5, more preferably 4.

The specific examples of the monomer (E) may be vinyl pivalate, vinyl isobutyrate, vinyl pivalate, vinyl isovalerate and vinyl hydroangelicate. Among them, vinyl pivalate is preferred from viewpoint such that the glass transition point of the fluorinated copolymer (X) will easily be high.

In the fluorinated copolymer (X), such monomers (E) may be used alone or in combination as a mixture of two or more of them.

The amount of the monomer (E) to be used is in a range of from 0 to 32 mol % based on the total monomers to be used for a synthesis of the fluorinated copolymer (X), and the sum of the monomers (B) and (E) is adjusted to be from 30 to 50 mol % based on the total monomers. If the sum of the monomers (B) and (E) is less than 30 mol %, it will be difficult to adjust the glass transition point of the fluorinated copolymer (X) to be at least 50° C. The total content of the monomers (B) and (E) is preferably from 30 to 40 mol %.

That is, in the present invention, when the amount of the monomer (B) is at least 30 mol % of the total monomers, the monomer (E) may not be used (the amount of the monomer (E) to be used may be 0 mol %). When the monomer (E) is used, its amount to be used is preferably at least 1 mol %, and the sum of the monomers (B) and (E) will be adjusted to be in the above range.

When the amount of the monomer (B) is at least 2 mol % and less than 30 mol % of the total monomers, the monomer (E) is essential, and the monomer (E) is preferably used in an amount of at least 1 mol % and at most 32 mol %, based on the total monomers to be used for synthesis of the fluorinated copolymer (X). The total of the monomers (B) and (E) is adjusted to be in the above range.

In the present invention, the monomer (B) and the monomer (E) are preferably used in combination. When the monomers (B) and (E) are used in combination, the molar ratio (B)/(E) of the content of the monomer (B) to the content of the monomer (E), based on the total monomers to be used for synthesis of the fluorinated copolymer (X), is preferably from 2/39 to 2/3, more preferably from 1/11 to 10/25. When the (B)/(E) is at least the lower limit and at most the upper limit of the above range, it is possible to obtain a coated film excellent in balance of toughness and appearance.

Other Monomers

In addition to the above monomers (A) to (E), it is possible to use monomers containing a double bond (other than ones included in (B) to (E)) copolymerizable with chlorotrifluoroethylene or tetrafluoroethylene, as the case requires. Such other monomers may, for example, be a vinyl ester not included in the above monomer (E), an allyl ether, an allyl ester, an acrylate and a methacrylate.

When such other monomers are used, the amount to be used is at most 10 mol % based on the total monomers to be used for synthesis of the fluorinated copolymer (X).

The fluorinated copolymer (X) may be produced by carrying out a polymerization reaction of a mixture comprising the monomers (A) to (E) and, as the case requires, other monomers in prescribed proportions, by using a polymerization initiating source such as a polymerization initiator or an ionizing radiation, in the presence or absence of a polymerization catalyst.

The number average molecular weight of the fluorinated copolymer (X) is from 10,000 to 22,000, preferably from 12,000 to 18,000. When it is at least 10,000, the number of crosslinkable functional groups per molecule will be sufficient, and the strength of the coated film after a crosslinking reaction will be good. When it is at most 22,000, the increase of the melt viscosity in a range of from 160° C. to 220° C. will be suppressed, which is a commonly used baking temperature of the thermosetting powder coating material, whereby a coated film having a good appearance will be obtained.

In the present invention, the value of the number average molecular weight of the fluorinated copolymer (X) is a value obtained as calculated as polystyrene by a gel permeation chromatography method (GPC).

The number average molecular weight of the fluorinated copolymer (X) can be controlled by the amount of an initiator to be added and the usage of a chain transfer agent and/or the concentration of monomers in the polymerization system.

The glass transition point of the fluorinated copolymer (X) is at least 50° C. When the glass transition point is at least 50° C., it is possible to effectively prevent blocking such that the powder coating material as a solid becomes hard during storage at room temperature, whereby it cannot be applied.

The glass transition point of the fluorinated copolymer (X) can be controlled by the type of a side chain in monomers and/or the molecular weight. Specifically, in order to adjust the glass transition point to be at least 50° C., it is preferred to use the monomer (B) and the monomer (E). Further, it is preferred to increase the molecular weight of the fluorinated copolymer (X).

The upper limit of the glass transition point of the fluorinated copolymer (X) is not particularly limited but is preferably at most 100° C. from a viewpoint such that the fluorinated copolymer (X) is amorphous, and such that in film-forming of the powder coating material, curing takes place after the coating material is formed into a liquid, namely, the coating material starts to become a liquid at a temperature of from around 100 to 120° C. which is lower than a common curing initiating temperature of a thermosetting coating material of from 170 to 210° C., and the coating material to be cured is ideally suitably spread to form a coating film on the surface to be coated is before reaching the curing initiating temperature.

The content of the fluorinated copolymer (X) in the powder coating composition of the present invention is preferably from 44 to 80 mass %, more preferably from 50 to 60 mass %.

Curing Agent (Y)

A curing agent (Y) may be a compound reactive with a crosslinkable functional group present in the fluorinated copolymer (X).

For example, a polyisocyanate curing agent is preferred. Specific examples of the polyisocyanate curing agent may preferably be an adduct of isophorone diisocyanate or hexamethylene diisocyanate, which is a blocked isocyanate having an isocyanate group protected by epsilon caprolactam or an oxime, so that the protected group dissociates at a specific temperature to initiate a reaction; and a block agent-free polyisocyanate having isocyanate groups coupled with each other, so that it dissociates at a specific temperature to initiate the reaction. Specific tradenames may, for example, be VESTAGON series manufactured by Degussa Japan Co., Ltd., Crelan series manufactured by Bayer Ltd. and ALCURE series manufactured by Eastman Chemical Company.

Further, a curing agent other than such a polyisocyanate may, for example, be a melamine curing agent having a glycol urea structure (e.g. manufactured by Cymel, tradename: Powderlink series).

Further, it is possible to apply a known method wherein a polymer having a carboxyl group is used as a curing agent, and a condensation reaction is carried out by an ester exchange catalyst (e.g. Japanese Patent No. 3716946 and Japanese Patent No. 3711624).

The content of the curing agent (Y) in the powder coating composition of the present invention is such that when the number of mols of a functional group reactive with the curing agent (Y), present in the fluorinated copolymer (X) is 1, the ratio (INDEX) of the number of mols of a crosslinkable group present in the curing agent (Y) is preferably from 0.7 to 1.3, more preferably from 0.8 to 1.2.

Other Components

As the case requires, the powder coating composition may contain, in addition to the fluorinated copolymer (X) and curing agent (Y), an additive such as a coloring pigment, an extender pigment, a defoaming agent, an antioxidant, an ultraviolet absorber, a radical scavenger, a surface regulator, an antiseptic agent, a corrosion inhibitor, an antibacterial agent, a curing reaction catalyst or a flowability-improving agent; wax; a thermoplastic or thermosetting fluororesin; or a nonfluorinated resin such as an acrylic resin or a polyester resin.

The total content of other components in the powder coating composition of the present invention is preferably at most 45 mass %, more preferably from 30 to 40 mass %.

For example, the powder coating composition of the present invention can be produced by a process of mixing the fluorinated copolymer (X), the curing agent (Y) and, as the case requires, other components in their solid states, followed by melt-kneading and cooling to obtain an aggregate, and such an aggregate is pulverized into a powder form.

The step of mixing the respective components in their solid state can be carried out by using a mixer such as a rapid mixer, a V-type mixer or an inversion mixer. It is preferred to mix the respective components in a powder state.

The step of melt-kneading can be carried out by using various types of extruders such as a single-screw type, a double-screw type and a planetary gear type. The mixture of the respective components is kneaded in a heat-melted state to homogenize the respective components. It is preferred that an extruded melt-kneaded product is cooled and pelletized.

The step of pulverizing the pelletized composition can be carried out by using a pulverizer such as a pin mill, a hammer mill or a jet mill. After the pulverization, it is preferred to carry out a step of classification to obtain a necessary particle size.

The particle size of the powder coating composition obtained in such a manner may be equal to a particle size of a common powder coating material. For example, it is preferably from about 25 to 50 μm with a 50% average volume particle size distribution. The measurement of the particle size of the powder coating material is carried out by using a particle size measuring machine of a type to measure a potential change during passage through pores, one of a laser diffraction system, of a type to judge an image, or of a sedimentation rate measuring system.

The powder coating composition of the present invention is applied on an object to be coated by using a coating device such as an electrostatic coater, a fluidized-bed coater, a frictional electrification coater, a cloud coater or a brush-type coater.

The material of the object to be coated may suitably be a metal such as aluminum, iron or magnesium.

The coating will be followed by baking at a prescribed temperature to form a coated film. The baking temperature is set depending on the reaction temperature of a curing agent to be used. For example, when a polyisocyanate curing agent is used, the baking temperature is usually from about 170 to 210° C.

The thickness of the coated film is not particularly limited, but it is usually at most 100 μm.

With respect to the powder coating composition of the present invention, the fluorinated copolymer (X) contained therein has a glass transition point of at least 50° C., whereby blocking such that the powder coating material becomes hard during storage, is suitably prevented.

Further, the coated film formed by using the powder coating composition of the present invention has excellent smoothness, suitable gloss and good appearance, and also is excellent in flexibility and scarcely susceptible to damage by deformation of the object to be coated, and the hardness of the coated film is high. Further, since the component of the coated film is a fluorinated copolymer, it is also excellent in the performance of weather resistance.

Consequently, according to the present invention, while blocking of the powder coating material is prevented, it is possible to achieve both good coated film appearance and good physical property which used to be difficult with a conventional powder coating composition to fulfill at the same time.

The reason considered to be as follows. That is, the present inventors have focused on a phenomenon of curing-shrinkage after the curing reaction of the thermosetting powder coating material, and they have found that when a cured state having non-uniform network structure is formed by a phenomenon such that a crosslink is formed between crosslinkable functional groups in the same molecule, non-uniform curing shrinkage occurs, and as a result, deterioration of the coated film appearance, decrease of physical property and especially decrease of flexibility are caused. Moreover, by copolymerizing the above monomers of the present invention in a specific ratio, it is possible to obtain a high glass transition point, and it is also possible to form uniform hardness state since the molecular flexibility in the fluorinated copolymer is suppressed, crosslinkable functional groups in the same molecule are prevented from being close to each other, and a cross-linking reaction between different molecules is accelerated. As a result, it is considered possible to achieve prevention of blocking and both good appearance and physical property of the coated film at the same time.

Especially, the monomer (B) and the monomer (E) have a long alkyl chain not bonded to the main chain of the copolymer, whereby an effect of suppressing freeness of the main chain is high, and a substitution reaction rarely takes place as compared with one having a cyclic alkyl chain. Further, in a case where the monomer (A) is chlorotrifluoroethylene, the monomer (C) will be properly incorporated in the copolymer molecule by taking the above alternating copolymer structure, whereby the network structure during the crosslinking reaction will be more uniform. Therefore, the contribution of the monomer (B) to the effect of the present invention is considered to be large. Further, as disclosed in the following Examples, by using the monomer (B) as a vinyl ether and the monomer (E) as a vinyl ester in combination, the appearance and flexibility of the coated film will further be improved. The details of the reason are not apparent, but it is considered that by changing the distance between the side chain and the main chain, it will be possible to easily orient a bulky side chain functional group.

EXAMPLES

Now, the present invention will be described in further detail with reference to Examples, but it should be understood that the present invention is by no means restricted thereto.

In the following Examples, the number average molecular weight of the fluorinated copolymer is a value obtained as calculated as a polystyrene by gel permeation chromatography method (GPC).

Production Example 1

Production of Fluorinated Copolymer (1)

Into a stainless steel autoclave having an inner volume of 250 mL and provided with a stirrer, a monomer mixture comprising 36.5 g of tert-butyl vinyl ether (t-BuVE), 3.8 g of ethyl vinyl ether (EVE) and 13.7 g of hydroxybutyl vinyl ether (HBVE); 57.5 g of xylene; 16.2 g of ethanol; 1.1 g of potassium carbonate; 0.7 g of a xylene solution containing 50 mass % of tert-butyl peroxypivalate (PBPV); and 65 g of chlorotrifluoroethylene (CTFE), were introduced. Then, the temperature was gradually raised, and when it reached 55° C., such temperature was kept for 20 hours. After that, the temperature was raised to 65° C. and kept for 5 hours. Then, the mixture was cooled and filtrated to remove a residue.

The xylene solution of a fluorinated copolymer thus obtained was subjected to a thin-film evaporation, and drying was carried out until the solid content concentration became at least 99 mass %. With respect to a fluorinated copolymer (1) thus obtained, the glass transition point (Tg) by a differential scanning calorimetry (DSC) was 54° C., and the number average molecular weight (Mn) by chromatography (GPC) was 18,000.

In the following Table 1, the proportion (unit: mol %) of each monomer used for the synthesis of the fluorinated copolymer is shown, and also the results of measuring the number average molecular weight and the glass transition temperature of the obtained fluorinated copolymer are shown (the same applies hereinafter).

Production Example 2

Production of Fluorinated Copolymer (2)

In the above Production Example 1, the monomer mixture was changed to a mixture comprising 10.4 g of t-BuVE, 38.5 g of vinyl pivalate (VPV) and 13.2 g of HBVE.

The amount of xylene used was changed to 55.5 g, and is the amount of ethanol used was changed to 15.7 g. Further, the amount of CTFE used was changed to 63 g.

Other than that, the same operation as in Production Example 1 was carried out to obtain a fluorinated copolymer (2) having Tg of 56° C. and Mn of 12,000.

Production Example 3

Production of Fluorinated Copolymer (3)

A fluorinated copolymer was produced without using the monomer (B). That is, in Production Example 1, tert-butyl vinyl ether was used as the monomer (B), and ethyl vinyl ether was used as the monomer (D). However, they were not used in this Example, and cyclohexyl vinyl ether (CHVE) was used as the monomer (D).

Specifically, in the above Production Example 1, the monomer mixture was changed to a mixture comprising 13.3 g of HBVE and 51.2 g of cyclohexyl vinyl ether (CHVE).

The amount of xylene used was changed to 55.8 g and the amount of ethanol used was changed to 15.7 g. Further, the amount of CTFE used was changed to 63 g.

Other than that, the same operation as in Production Example 1 was carried out to obtain a fluorinated copolymer (3) having Tg of 53° C. and Mn of 12,000.

Production Example 4

Production of Fluorinated Copolymer (4)

A fluorinated copolymer was produced without using the monomer (B). That is, in Production Example 1, tert-butyl vinyl ether was used as the monomer (B), and ethyl vinyl ether was used as the monomer (D). However, they were not used in this Example, and cyclohexyl vinyl ether (CHVE) and 2-ethylhexyl vinyl ether (2EHVE) were used as the monomer (D).

Specifically, in the above Production Example 1, the monomer mixture was changed to a mixture comprising 9.6 g of HBVE, 24 g of cyclohexyl vinyl ether (CHVE) and 22 g of 2-ethylhexyl vinyl ether (2EHVE).

The amount of xylene used was changed to 66.5 g and the amount of ethanol used was changed to 18.8 g. Further, the amount of CTFE used was changed to 50 g.

Other than that, the same operation as in Production Example 1 was carried out to obtain a xylene solution of the fluorinated copolymer (4). The glass transition point measured by DSC and the number average molecular weight measured by GPC were Tg of 24° C. and Mn of 12,200.

Production Example 5

Production of Fluorinated Copolymer (5)

A fluorinated copolymer was produced without using the monomer (B). That is, in Production Example 1, tert-butyl vinyl ether was used as the monomer (B). However, it was not used in this Example, and vinyl pivalate (VPV) was used as the monomer (E) and 2-methoxypropene (2MP) as another monomer.

Specifically, in the above Production Example 1, the monomer mixture was changed to a mixture comprising 12.4 g of HBVE, 3.8 g of ethyl vinyl ether (EVE), 7.7 g of 2-methoxypropene (2MP) and 34.2 g of vinyl pivalate (VPV).

The amount of xylene used was changed to 57.2 g and the amount of ethanol used was changed to 16.1 g. Further, the amount of CTFE used was changed to 64.6 g.

Other than that, the same operation as in Production Example 1 was carried out to obtain a fluorinated copolymer (5) having Tg of 54° C. and Mn of 14,000.

Production Example 6

Production of Fluorinated Copolymer (6)

In the above Production Example 1, the above monomer mixture was changed to a mixture comprising 3.1 g of t-BuVE, 4.5 g of EVE, 12.1 g of HBVE and 41.5 g of VPV. The amount of xylene used was changed to 56 g and the amount of ethanol used was changed to 15.8 g. Further, the amount of CTFE used was changed to 63.2 g.

Other than that, the same operation as in Production Example 1 was carried out to obtain a fluorinated copolymer (6) having Tg of 52° C. and Mn of 12,000.

TABLE 1

| | | Proportions of monomers used (mol %) | | | | | |
|---|---|---|---|---|---|---|---|
| | Monomers | Fluorinated copolymer (1) | Fluorinated copolymer (2) | Fluorinated copolymer (3) | Fluorinated copolymer (4) | Fluorinated copolymer (5) | Fluorinated copolymer (6) |
| A | CTFE | 50 | 50 | 50 | 50 | 50 | 50 |
| B | t-BuVE | 34 | 10 | | | | 3 |
| C | HBVE | 11 | 11 | 11 | 10 | 10 | 10 |
| D | EVE | 5 | | | | 5 | 6 |
| | CHVE | | | 34 | 23 | | |
| | 2EHVE | | | | 17 | | |
| E | VPV | | 29 | | | 25 | 31 |
| Others | 2MP | | | | | 10 | |
| | Number average molecular weight | 18000 | 12000 | 12000 | 12200 | 14000 | 12000 |
| | Glass transition temperature (° C.) | 54 | 56 | 53 | 24 | 54 | 52 |

Examples 1 to 3 and Comparative Examples 1 and 2

By using each fluorinated copolymers (1) to (3), (5) and (6) obtained in the above Production Examples 1 to 3, 5 and 6, powder coating compositions (1) to (3), (5) and (6) were produced.

That is, 116 g of the fluorinated copolymer, 28 g (INDEX=1) of a curing agent (manufactured by Degussa Japan Co., Ltd. tradename: VESTAGON B1530), 0.8 g of benzoin, 2 g of a surface regulator (manufactured by BYK-Chemie Japan KK, tradename: BYK-360P), 0.0042 g of dibutyltin dilaurate as an additive and 70 g of titanium dioxide (manufactured by DuPont Kabushiki Kaisha, tradename: Ti-Pure R960) as a coloring agent, were mixed in a powder state by using a rapid mixer. The obtained mixture was subjected to a melt-kneading by using a double-screw extruder (manufactured by Thermo Prism, 16 mm extruder) at a barrel temperature of 120° C. to obtain coating composition pellets. The obtained pellets were pulverized by using a pulverizer at room temperature, followed by classification by a mesh. In such a manner, powder coating compositions (1) to (3), (5) and (6) having an average particle size of about 40 μm were obtained.

Further, since the fluorinated copolymer (4) has a glass transition temperature of lower than 50° C., it was not possible to produce a powder coating composition.

The average particle size in the above Examples and Comparative Examples is a value measured by a laser diffraction type particle size distribution measuring machine (manufactured by Sympatec, tradename: Helos-Rodos) and obtained by a 50% average volume particle size distribution.

Evaluations of Physical Properties of Coated Film

Preparation of Test Specimen

By using each of the powder coating compositions obtained in the above Examples and Comparative Examples, electrostatic coating was carried out on one side of an aluminum sheet treated with chromate by means of an electrostatic coater (manufactured by Onoda Cement Co., Ltd., tradename: GX3600C). It was kept for 20 minutes under an atmosphere of 200° C., followed by cooling to obtain a coated sheet having a thickness of coated film of from 55 to 65 μm.

By using each the obtained coated sheet as a test specimen, the following tests were carried out. The results are shown in the following Table 2.

Weight-Drop Resistance (Front Surface Hitting)

It was carried out by a testing method in accordance with JIS K5600-5-3. By means of DuPont type impact deformation tester and using a punch having a radius of 6.35 mm, a die and a weight having a mass of 500 g, the weight was dropped on the coated surface of the specimen. The highest weight-drop height (unit: cm) where no breakage or peeling formed by deformation by an impact, was measured.

Weight-Drop Resistance (Rear Surface Hitting)

The test was carried out in the same manner as in "WEIGHT-DROP RESISTANCE (FRONT SURFACE HITTING)" except that the weight was dropped on a non-coated side surface (rear side of the coated surface) of the specimen. Peeling by a transparent pressure-sensitive adhesive tape was carried out at a portion where deformation of the coated surface was formed by the impact, and the highest weight-drop height (unit: cm) where the coated film was not peeled, was measured.

Scratch Hardness

The test was carried out by a testing method in accordance with JIS K5600-5-4. The hardness of the hardest pencil which did not leave any scratch, was measured.

Smoothness

By using standard plates for appearance of powder coating material standard ("bad appearance to good appearance" is evaluated on a scale of "1 to 10", wherein 10 is the best) of American PCI, and by visually comparison, the smoothness or appearance was digitalized. The evaluated value of at least 6 is regarded as "passed" and 5.5 or less is regarded as "failed".

Specular Gloss

The gloss (60° and 20°) of the coated surface was measured by a testing method in accordance with JIS K5600-4-7. The larger the numeric value, the better the gloss.

TABLE 2

| Evaluation of coated film | Ex. 1 Powder coating composition (1) | Ex. 2 Powder coating composition (2) | Comp. Ex. 1 Powder coating composition (3) | Comp. Ex. 2 Powder coating composition (5) | Ex. 3 Powder coating composition (6) |
|---|---|---|---|---|---|
| Weight-drop resistance (front surface hitting) (cm) | 70 | 45 | 35 | 45 | 75 |
| Weight-drop resistance (rear surface hitting) (cm) | 100 | 40 | 25 | 60 | At least 100 |
| Scratch hardness | F | H | H | F | F |
| Smoothness | Passed 6.5 | Passed 7 | Failed 3.5 | Failed 5.5 | Passed 7.5 |
| Specular gloss 60° | 71 | 76 | 83 | 76 | 74 |
| Specular gloss 20° | 44 | 49 | 55 | 46 | 51 |

According to the results in Table 2, with respect to Examples 1 to 3, the weight-drop resistance is improved, and the appearance is fulfilled with the desired value, as compared with Comparative Example 1. With respect to Comparative Example 2, the weight-drop resistance is improved as compared with Comparative Example 1, but the appearance is not fulfilled with the desired value. As for the scratch hardness and the specular gloss, each case was about the same. Consequently, it is evident that in Examples 1 to 3, suitable appearance and flexibility of the coated film were simultaneously achieved.

INDUSTRIAL APPLICABILITY

The powder coating composition of the present invention can be used as a powder coating material at room temperature without a problem, and it fulfills both suitable appearance and flexibility of the coated film, whereby it is also applicable as road/construction materials such as bridges, bridge railings, gates, fences, house siding materials which are required to have weather resistance; bodies and parts of automobiles; and home electric appliances.

The entire disclosure of Japanese Patent Application No. 2006-132503 filed on May 11, 2006 including specification, claims and summary is incorporated herein by reference in its entirety.

What is claimed is:

1. A powder coating composition comprising:
a fluorinated copolymer (X) having a glass transition point of at least 50° C. and a number average molecular weight of from 10,000 to 22,000, and
a curing agent (Y), wherein the fluorinated copolymer (X) is a copolymer obtained by polymerization of a monomer mixture comprising:

(A) from 45 to 55 mol % of chlorotrifluoroethylene and/or tetrafluoroethylene, (B) from 2 to 40 mol % of a vinyl ether which has a $C_{4\,or\,5}$ alkyl group containing a tertiary carbon atom, (C) from 5 to 20 mol % of a vinyl ether having a crosslinkable functional group and (E) from 1 to 32 mol % of a vinyl ester which has a $C_{3-5}$ alkyl group containing a tertiary or higher carbon atom, wherein the total content of (B) and (E) is from 30 to 50 mol %, and the curing agent (Y) is reactive with the crosslinkable functional group.

2. The powder coating composition according to claim 1, wherein the molar ratio (B)/(E) of the content of (B) to the content of (E) in the monomer mixture, is from 2/39 to 2/3.

3. The powder coating composition according to claim 1, wherein the total content of (B) and (E) in the monomer mixture, is from 30 to 40 mol %.

4. The powder coating composition according to claim 1, wherein the monomer mixture comprises (D) from 1 to 15 mol % of a vinyl ether other than the vinyl ether included in (B) or (C).

5. The powder coating composition according to claim 4, wherein the content of (D) in the monomer mixture is from 5 to 15 mol %.

6. The powder coating composition according to claim 4, wherein (D) is a vinyl ether having a linear $C_{2-6}$ alkyl group.

* * * * *